(12) United States Patent
Nookula et al.

(10) Patent No.: US 11,699,093 B2
(45) Date of Patent: Jul. 11, 2023

(54) AUTOMATED DISTRIBUTION OF MODELS FOR EXECUTION ON A NON-EDGE DEVICE AND AN EDGE DEVICE

(71) Applicant: Amazon Technologies, Inc., Seattle, WA (US)

(72) Inventors: Nagajyothi Nookula, Seattle, WA (US); Poorna Chand Srinivas Perumalla, Seattle, WA (US); Aashish Jindia, San Francisco, CA (US); Danjuan Ye, San Mateo, CA (US); Eduardo Manuel Calleja, San Francisco, CA (US); Song Ge, Foster City, CA (US); Vinay Hanumaiah, San Jose, CA (US); Wanqiang Chen, San Jose, CA (US); Safeer Mohiuddin, Saratoga, CA (US); Romi Boimer, Newark, NJ (US); Madan Mohan Rao Jampani, Mountain View, CA (US); Fei Chen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1309 days.

(21) Appl. No.: 15/872,547

(22) Filed: Jan. 16, 2018

(65) Prior Publication Data
US 2019/0220783 A1    Jul. 18, 2019

(51) Int. Cl.
*G06N 5/02*  (2023.01)
*G06N 20/00*  (2019.01)
*G06N 5/022*  (2023.01)
*G06F 9/50*  (2006.01)

(52) U.S. Cl.
CPC .......... *G06N 20/00* (2019.01); *G06F 9/5044* (2013.01); *G06F 9/5066* (2013.01); *G06N 5/022* (2013.01)

(58) Field of Classification Search
CPC ...... G06N 5/043; G06N 5/022; G06F 9/5066; G06F 9/5044
See application file for complete search history.

(56) References Cited

U.S. PATENT DOCUMENTS

| | | | |
|---|---|---|---|
| 8,756,044 B2 | 6/2014 | Ramamurthy et al. | |
| 9,442,696 B1 | 9/2016 | Koh et al. | |
| 10,803,399 B1 * | 10/2020 | Cohen | G06F 16/93 |
| 2014/0259109 A1 * | 9/2014 | Houston | H04L 63/08 |
| | | | 726/3 |
| 2014/0359563 A1 | 12/2014 | Xie et al. | |

(Continued)

OTHER PUBLICATIONS

International Preliminary Report on Patentability for related International Application No. PCT/US2019/013840, dated Jul. 30, 2020, 13 pages.

(Continued)

*Primary Examiner* — Nhat Huy T Nguyen
(74) *Attorney, Agent, or Firm* — Nicholson De Vos Webster & Elliott LLP

(57) ABSTRACT

Techniques for generating and executing an execution plan for a machine learning (ML) model using one of an edge device and a non-edge device are described. In some examples, a request for the generation of the execution plan includes at least one objective for the execution of the ML model and the execution plan is generated based at least in part on comparative execution information and network latency information.

19 Claims, 9 Drawing Sheets

(56) References Cited

U.S. PATENT DOCUMENTS

| | | | |
|---|---|---|---|
| 2017/0339021 A1 | 11/2017 | Dukatz | |
| 2018/0285767 A1* | 10/2018 | Chew | ............... H04L 67/12 |
| 2019/0050714 A1* | 2/2019 | Nosko | ............ G06N 3/0454 |
| 2019/0208007 A1* | 7/2019 | Khalid | ............ G06F 16/178 |
| 2022/0083386 A1* | 3/2022 | Almeida | ............ G06F 9/5038 |

OTHER PUBLICATIONS

Office Action for related European Application No. 19704906.7, dated Feb. 4, 2021, 11 pages.

International Search Report and Written Opinion for related International Application No. PCT/US2019/013840, dated Apr. 2, 2019, 17 pages.

Decision to grant a European patent, EP App. No. 19704906.7, dated Aug. 4, 2022, 2 pages.

Intention to grant, EP App. No. 19704906.7, dated Mar. 23, 2022, 6 pages.

\* cited by examiner

AUTOMATED DISTRIBUTION OF MODELS FOR EXECUTION ON A NON-EDGE DEVICE AND AN EDGE DEVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Machine learning can be used to solve many problems for which there are existing examples of answers to the problems. Machine learning models may be deployed in virtualized environments (such as that detailed above) including web services offerings, or in local environments.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for automated distribution of machine learning (ML) models for execution at an edge device and/or at a non-edge device are described.

ML models deployed for execution are typically fast and cost-effective and are to be processed at a desired throughput (such as images/second) with an acceptable latency. As detailed above, ML models may be deployed at web services providers or in local devices (such as a device at an edge of a network connection ("edge device")). With edge devices growing more computationally powerful, some ML models that would otherwise have been better off executed in a more powerful system provided by a web service provider can instead by deployed to an edge device. However, edge devices are usually limited in resource capability compared to a web service provider and hence models that are deployed to an edge device are often constrained. Detailed herein are embodiments of systems, methods, and apparatuses for the generation and execution of execution plans that distributes the execution of ML models between one or more edge devices and a non-edge device environment. When one or more edge devices are used this is done in a distributed manner in most embodiments.

Figure 1:
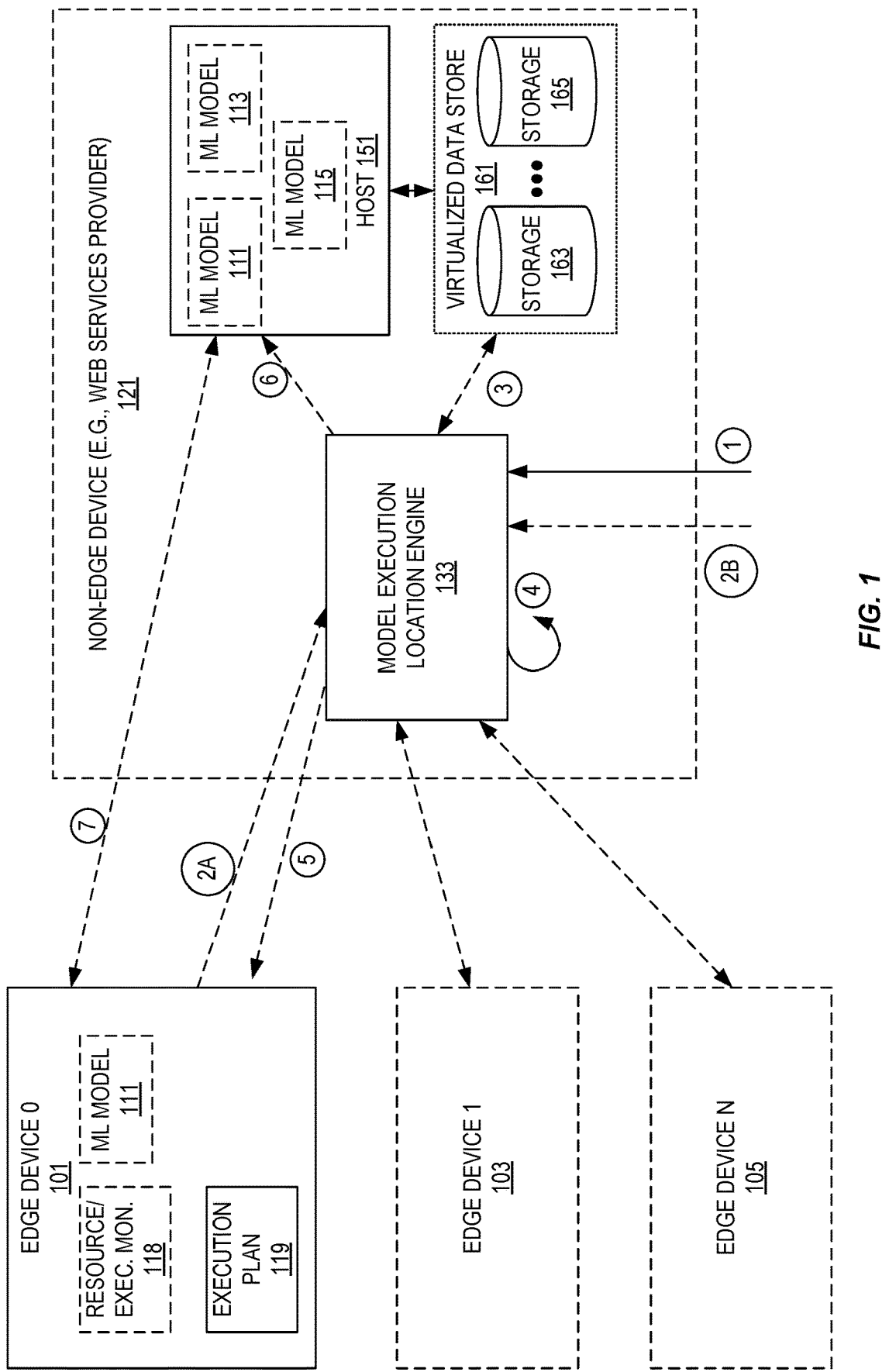
FIG. 1 illustrates an example of a system utilizing ML model distribution according to some embodiments.

FIG. 1 illustrates an example of a system utilizing ML model distribution according to some embodiments. In this illustration, a non-edge device 121 (such as a web services provider) provides at least computing resources and database storage in a virtualized environment such as that detailed above. The non-edge device 121 may have many different physical machines with varying combinations of processors, memory, storage, and networking capacity and/or capability. For example, the non-edge device 121 includes compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc.

As such, a ML model (and any pre- and post-processing) may be executed on a physical machine of the non-edge device 121 that has a combination of compute resources that are optimal for the ML model. For example, a host 151 may be made to execute one or more ML models 111-115 wherein the physical device used as the host 151 includes hardware that is more advantageously suited for executing the ML model than other hosts of the non-edge device 121. These ML models 111-115 may use data stored in storage 163-165 of a virtualized data store 161.

As detailed, a ML model 111 may also be executed on one or more edge devices 101-105. Exemplary edge devices include, but are not limited to: cameras, mobile devices, audio equipment, etc. However, these devices 101-105 are typically less powerful than the host(s) provided by the non-edge device 121.

A model location engine 133 executes on the non-edge device 121 to analyze usage of a ML model (and any pre- and post-processing) and to provide an execution plan of how that ML model and its pre- and post-processing should be executed. For example, the model execution location engine 133 uses one or more of the following to decide where a ML model, or constituent parts thereof, should run: 1) edge device characteristics including, for example, FLOPS, GPU RAM, CPU RAM, CPU speed, etc.; 2) network characteristics; 3) model weights; 4) available logic for pre-processing and post-processing the data such as resizing the data, get KNN, etc.; 5) previous execution plans; 6) data sets for training the ML model; 6) non-edge device characteristics; and/or 7) desired objectives of ML model execution (such as throughput and power usage). For example, an aspect of an execution plan may be to filter at the edge device and perform inference at the non-edge device. In most embodiments, the model execution location engine 133 includes code that is executed by the non-edge device 121 to generate an execution plan.

Each edge device 101-105 stores an execution plan, or portion thereof, and may store a ML model (or portions thereof) 111. The execution plan 119 may not be the output of the model execution location engine 133, but rather code written to implement the outputted plan. Additionally, in some embodiments, the edge devices 101-105 include resource and/or execution monitoring for use in implementing the execution plan.

In this illustration, there are several circles with numbers which are used to illustrate an exemplary flow according to some embodiments. At circle 1, a request to generate an execution plan is received by the model execution location engine 133. Typically, this request is in the form of an application programming interface (API) call. The request includes objectives for the execution of the ML model (and any pre- and post-processing). Exemplary objectives may include, but are not limited to: throughput, power usage, acceptable network latency, etc.

The model execution location engine 133 utilizes information about the edge device, and its network connection to the non-edge device 121, that is proposed to execute at least a portion of the ML model. That information may be provided in several ways as detailed later.

In some embodiments, at circle 2A, the edge device 0 101 provides its device characteristics to the model execution location engine 133. For example, the edge device 0 101 may report out its CPU model, GPU model, RAM. Network characteristics for communication between the edge device 0 101 and the non-edge device 121 may also be calculated.

In some embodiments, at circle 2B, information about the edge device 0 101 is provided by a user. For example, the user provides an indication of the type of the edge device 0 101 and the model execution location engine 133 uses stored information about that type of edge device 0 101. As such, the details of the hardware of the edge device 101 is abstracted.

Additionally, in some embodiments, results of execution of the ML model (and any pre- and post-processing) on the edge device 0 101 are shared with the model execution location engine 133 at circles 2A and 2B. For example, information about the execution results can include whether the edge device 0 101 completed execution of the ML model, the throughput and/or power consumption when the ML model (and any pre- and post-processing) can be executed, resource usage by the execution, etc. In some embodiments, each discrete step (method) of the ML model execution (and any pre- and post-processing) is shared.

When a copy of the ML model was not provided (or the ML algorithm had not been trained), the model execution location engine 133 requests a copy of the ML model (or ML algorithm) from the data store 161 at circle 3. If the ML model was not trained, training data is also acquired from the data store 161 at circle 3.

The model execution location engine 133 utilizes the edge device information, network information regarding the edge device, the ML model (or ML algorithm), and non-edge device 121 characteristics and availability information to generate an execution plan at circle 4. An execution plan includes what discrete steps are to be performed by the edge device 0 101 and/or the non-edge device 121. In some embodiments, the execution plan has further granularity to address how the execution plan is to change when conditions (such as network congestion, throughput, and/or power consumption) change.

In some embodiments, the model execution location engine 133 executes the ML model (and any pre- and post-processing) on one or more hardware configurations in the non-edge device 121 to generate different execution profiles for the usage of the ML model and/or discrete steps of the usage of the ML model execution. Additionally, when the edge device 0 101 has not executed the ML model, the model execution location engine 133 either causes an execution by the edge device 0 101, or simulates an execution (for example, using a retrieved data set from data store 161). This generates one or more execution profiles for the ML model and/or discrete steps of the usage of the ML model execution. These generated profiles indicate throughput for the ML model and/or discrete steps of the usage of the ML model execution.

The model execution location engine 133 provides the execution plan 119 to the edge device 0 101 at circle 5 in some embodiments. Finally, at circle 5 the model execution location engine 133 also provides an indication of what to monitor during execution. In other embodiments, the model execution location engine 133 provides the execution plan 119 to a user to configure the execution plan for edge device 0 101. Additionally, the model execution location engine 133 may also provide the ML model 111, if the model execution location engine 133 caused the ML model generation, to the edge device 0 101.

In some embodiments, the model execution location engine 133 provides the ML model 111, or a subset thereof, to the host 151 for execution at circle 6. In some instances, the execution plan 119 is also provided to the host 151.

In some embodiments, the edge device 0 101 shares execution with at least one host of the non-edge device 121 to execute the ML model 111 in accordance to the execution plan 119 at circle 7.

Figure 2:
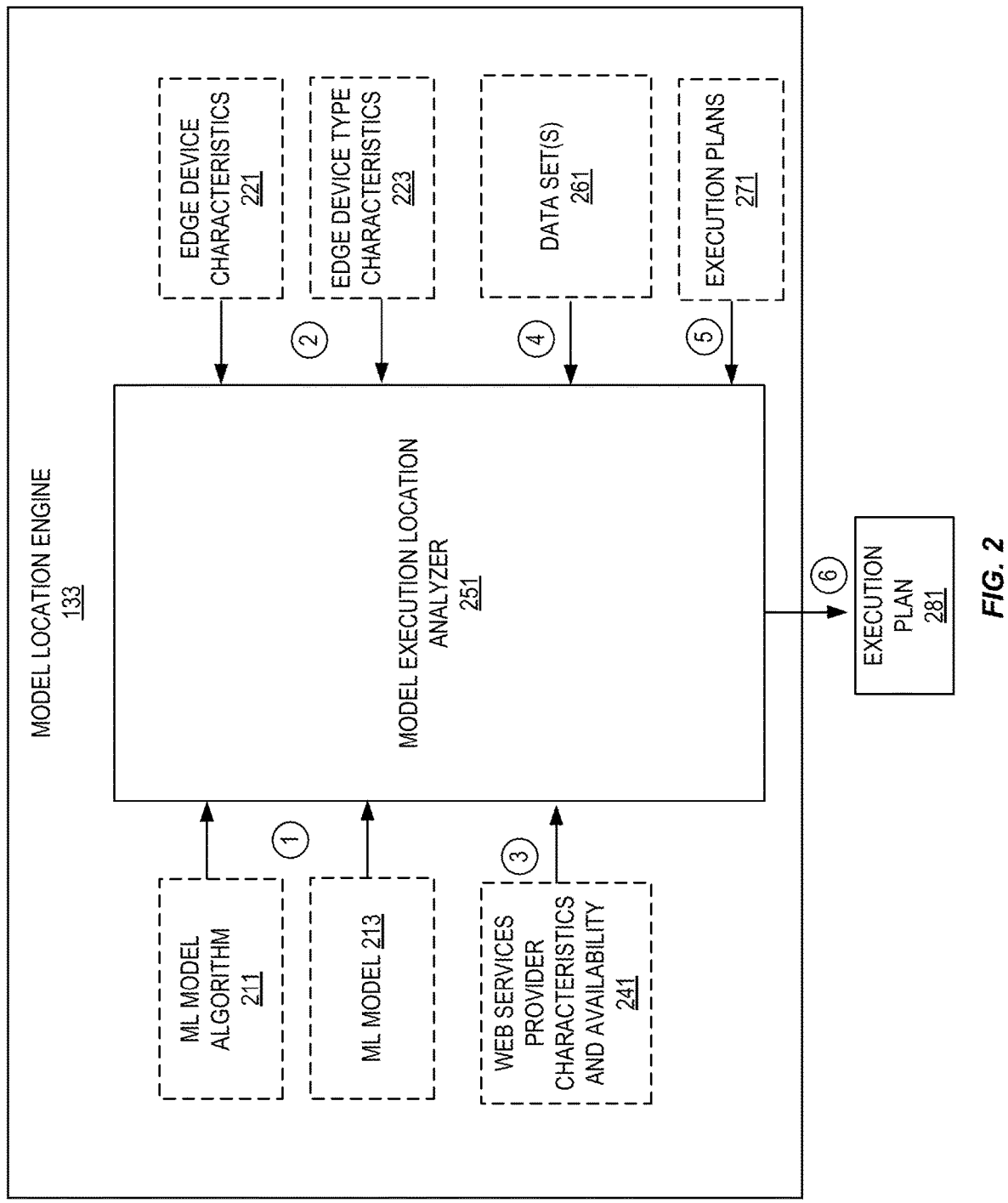
FIG. 2 illustrates an example of an embodiment of a model location engine.

FIG. 2 illustrates an example of an embodiment of a model location engine. The model execution location engine 133 includes a model location analyzer 251 that takes model, edge device, and non-edge device information to generate an execution plane 281 in response to a request. Note that one or more of the illustrated components are outside of the model execution location engine 133, but accessible to the model execution location analyzer 251 as indicated by the usage of dashed lines.

The model location analyzer 251 receives an input regarding the edge device to deploy the model to at circle 2. In some embodiments, particular edge device characteristics 221 are input. For example, the edge device itself may provide its hardware specifications, power availability, network reliability, location of the device, lifespan characteristics of the device under different load conditions, etc., or a user may provide this. In other embodiments, edge device type characteristics 223 are input. For example, a user provides information about the type of edge device (e.g., camera model) and the edge device type characteristics 223 are retrieved from a data store and supplied to the model location analyzer 251.

The model location analyzer 251 receives an input regarding the ML model to deploy at circle 2. In some embodiments, a ML model algorithm 211 is input for evaluation. For example, the ML model algorithm 211 is input and then evaluated according to one or more data sets 261 to produce the ML model and information about the execution of the ML model (and any pre- and post-processing) including throughput for discrete steps, etc. The evaluation may be done by model location analyzer 251 or caused by the model location analyzer 251.

In other embodiments, the ML model 213 itself is provided at circle 2. Information about the execution of the ML model 213 (and any pre- and post-processing), including throughput for discrete steps, etc., is either determined by the model location analyzer 251 or caused to be determined by the model location analyzer 251.

Web services provider characteristics and availability 241 are provided at circle 3 to the model location analyzer 251. For example, networking characteristics such as latency are provided. Additionally, information about what hosts are available and their characteristics are provided.

In some embodiments, one or more data sets 261 for training are provided at circle 4.

In some embodiments, prior execution plans 271 are provided and are used by the model location analyzer 251 to determine whether an execution plan is already available or ready for modification (for example, the same ML model 213 is being used but on different edge device hardware).

The model location analyzer 251 takes the input information and generates an execution plan 281 at circle 6.

Figure 3:
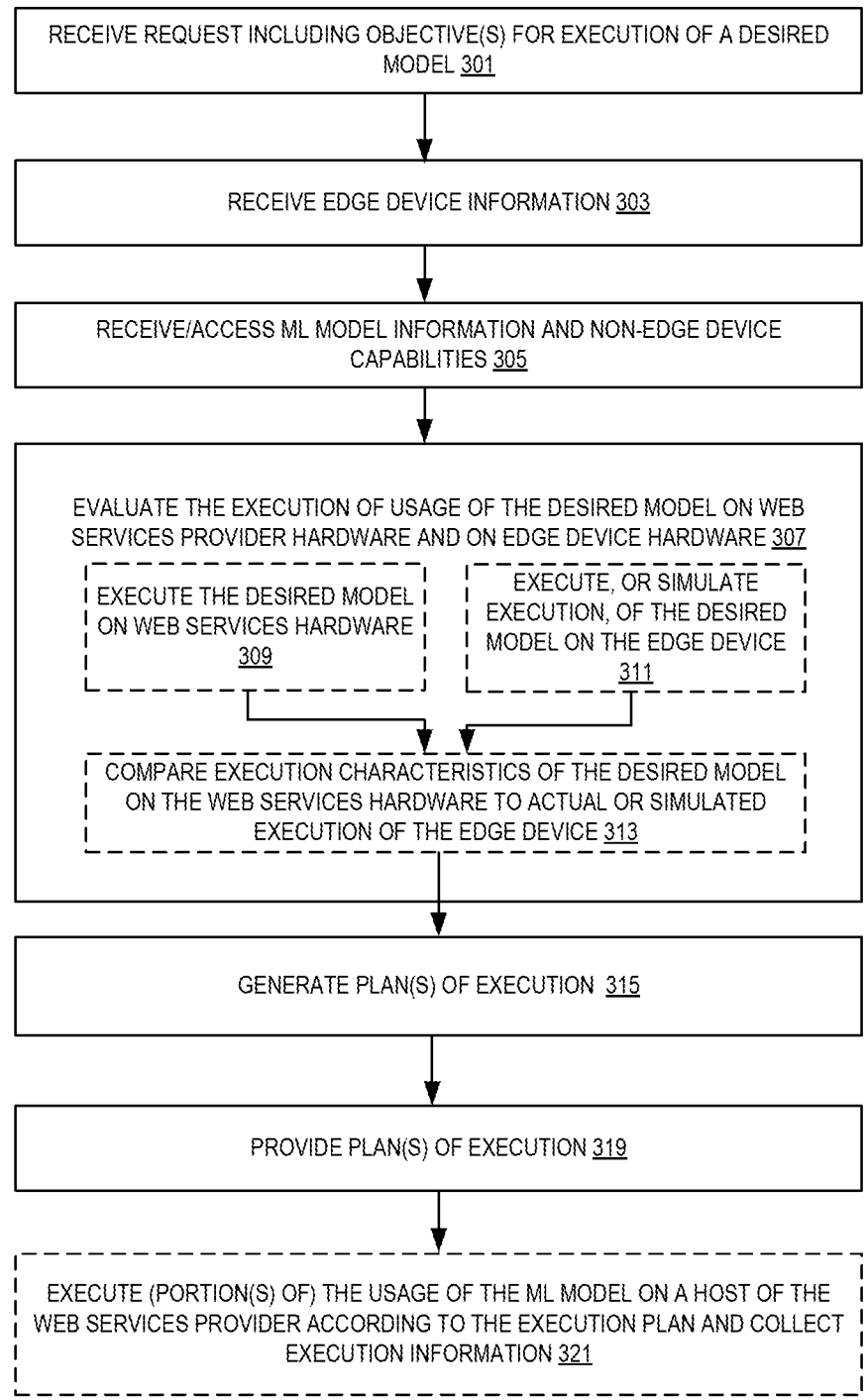
FIG. 3 illustrates an embodiment of a method of generating an execution plan by a model location engine/model location analyzer.

FIG. 3 illustrates an embodiment of a method of generating an execution plan by a model location engine/model location analyzer.

The model location engine/model location analyzer receives a request to generate an execution plan for a ML model at 301. This request includes at least one objective for the execution of the ML model such as throughput, power and resources consumed, etc. In some embodiments, the request includes the ML model itself. In other embodiments, the request includes a link to the ML model. In embodiments where the ML model has not been generated, the ML algorithm is either provided or linked (similarly, the data set is provided or linked).

At 303, the model location engine/model location analyzer receives edge device information. This information may be for a particular device or a type of device.

The model location engine/model location analyzer receives or accesses information about the ML model and non-edge device capabilities (such as hardware available, networking information, etc.) at 305.

At 307, the model location engine/model location analyzer evaluates the potential execution of the ML model (and any pre- and post-processing) on non-edge device hardware and on the edge device to be used. This evaluation results in comparative information about the objectives of the request (such as throughput, power usage, etc.) for the steps of the ML model (and any pre- and post-processing). This typically includes several aspects and exemplary tasks are illustrated, however, more tasks may be involved or different tasks may be executed.

In some embodiments, at 309, the desired ML model is executed on web services hardware to determine how the discrete steps of the ML model (and any pre- and post-processing) operate. Typically, the model location engine/model location analyzer evaluates the code using the ML model to determine what it believes to be the most optimal web services hardware available to run the ML model. In some embodiments, the ML model is first generated using training data available to the model location engine/model location analyzer. The execution provides at least throughput information for the ML model and/or parts thereof.

In some embodiments, at 311, the desired ML model is executed on the desired edge device hardware to determine how the discrete steps of the ML model (and any pre- and post-processing) operate, or would operate on the desired edge device. In other embodiments, this execution is simulated using characteristics of the edge device or type of edge device. For example, an instance type is identified to run the ML model that has the same, or similar, throughput as the edge device and an instance is run on that type. In some embodiments, the ML model is first generated using training data available to the model location engine/model location analyzer. The execution provides at least throughput information for the ML model and/or parts thereof, but may also provide other information useful to determine whether the objectives can be met by the desired edge device hardware (for example, power and resource usage).

The execution characteristics of the ML model in 309 and 311 are compared at 313 to determine what steps of the ML model (and any pre- and post-processing) should be executed by the edge device and under what circumstances.

The result of the comparison is used to generate at least one plan of execution at 315.

In some embodiments, the code using the ML model is evaluated without performing an execution, or simulation of an execution. The plan of execution may have different cases depending upon how conditions of execution (such as extra load on the edge device, a congested network, etc.) evolve. The generation of the execution plan also takes into account the network information as provided. In some embodiments, the object exchange format (such as JavaScript Objection Notation) and parameters associated therewith are evaluated. For example, different layers of a convolutional neural network are each evaluated as defined by the JSON description with the parameters being weights associated with each layer.

The plan(s) of execution are provided to a user (for example, through a console, browser, as a message, etc.) and/or the edge device(s) and/or a host at 319. In some embodiments, the ML model is updated to reflect what portions of the ML model are to be executed on the edge device and what portions are to be executed on a host of the non-edge device.

At 321, the non-edge device executes the ML model and/or pre- and post-processing. For example, a host on a web services provider executes the ML model. This execution is according to the stored execution plan. The execution may be less than all of the ML model dependent upon the execution plan. The portions of the ML model usage (including any pre- and post-processing) may be executed in a VM instance or as a container.

Figure 4:
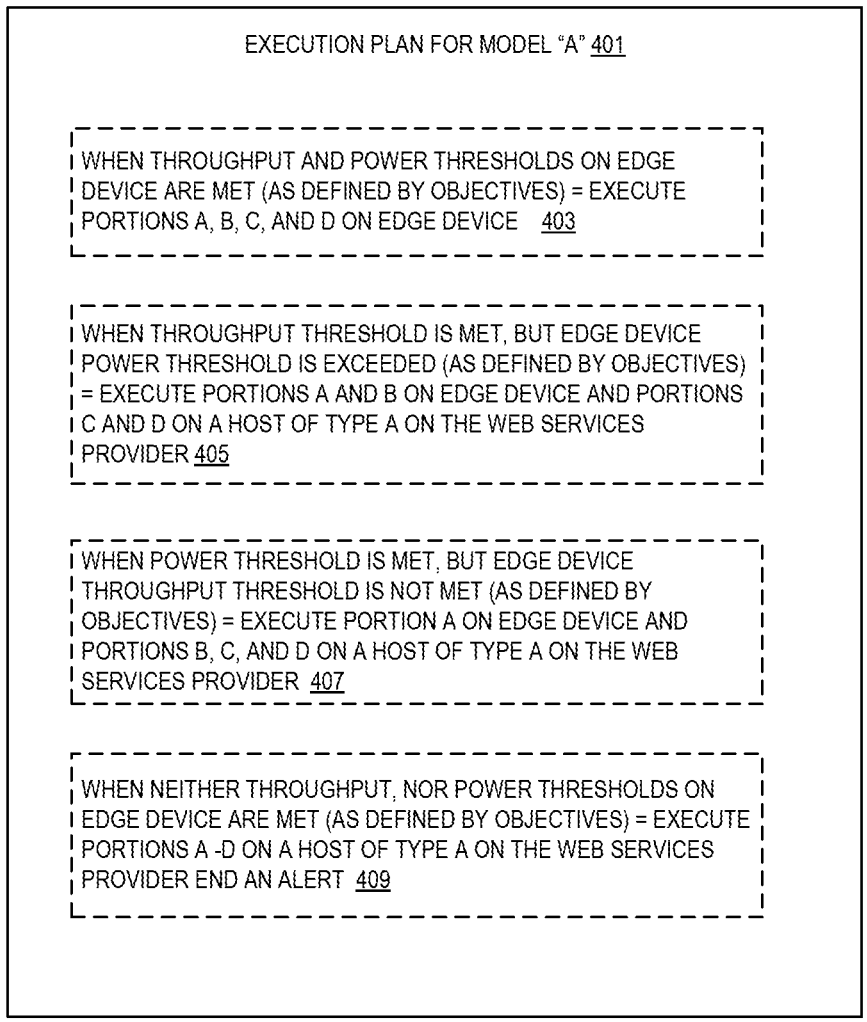
FIG. 4 illustrates an example of an execution plan for a ML model.

FIG. 4 illustrates an example of an execution plan for a ML model. In particular, this execution plan 401 includes four different "cases" of execution as a part of the plan. The first case 403 indicates that when the throughput and power thresholds are met by executing on the edge device (wherein the throughput and power thresholds are set by the objectives of the request), all portions of the ML model usage (including pre- and/or post-processing) are to be executed by the edge device.

The second case 405 indicates that when the throughput threshold is met by executing on the edge device, but the power threshold is not, portions A and B of the ML model usage are to be executed by the edge device and C and D by the non-edge device.

The third case 407 indicates that when the power threshold is met by executing on the edge device, but the throughput threshold is not, portion A of the ML model usage is to be executed by the edge device and B, C and D by the non-edge device.

The fourth case 409 indicates that when neither the throughput, nor power threshold are met by executing on the edge device, all portions of ML model usage are to be executed by the non-edge device.

As such, dependent upon the conditions of the edge device, the execution plan adjusts to meet the objectives. In this example, what resources (such as network latency, CPU usage, etc.) to monitor and statistics to collect are not shown. Further, in some embodiments, an execution plan takes into account the lifespan of the edge device using health monitoring metrics.

Figure 5:
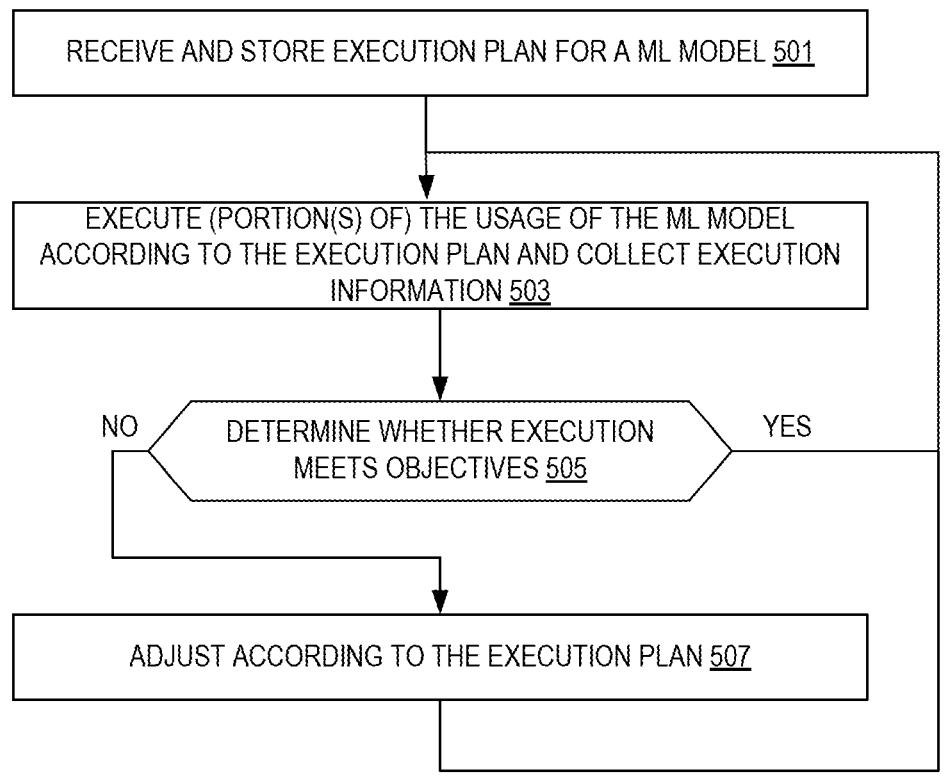
FIG. 5 illustrates an embodiment of a method of using an execution plan by an edge device.

FIG. 5 illustrates an embodiment of a method of using an execution plan by an edge device. The edge device receives and stores an execution plan for a ML model at 501. This execution plan is obtained from the model location engine in some embodiments. In other embodiments, the execution plan is obtained by a user based upon the execution plan from the model location engine. The execution plan also indicates what resources are to be monitored and what statistics are to be collected during execution in some embodiments. The ML model may also be stored.

At 503, the edge device executes the ML model (and potentially some pre- and post-processing). This execution is according to the stored execution plan. The execution may be less than all of the ML model depending upon the execution plan. As the ML model and pre- and post-processing (or portions thereof) is executed, the edge device collects execution information as indicated by the execution plan including, but not limited to, one or more of: latency, throughput, power usage, etc.

A determination of whether the execution plan implementation should be altered is made at 505. For example, is the throughput being met? Is the power threshold being exceeded? When the execution plan implementation is in-line with the execution plan, then the execution continues at 503. When the execution does not fit the plan as is (wrong case), then the edge device adjusts according to the plan at 507 and execution of the plan resumes at 503.

Figure 6:
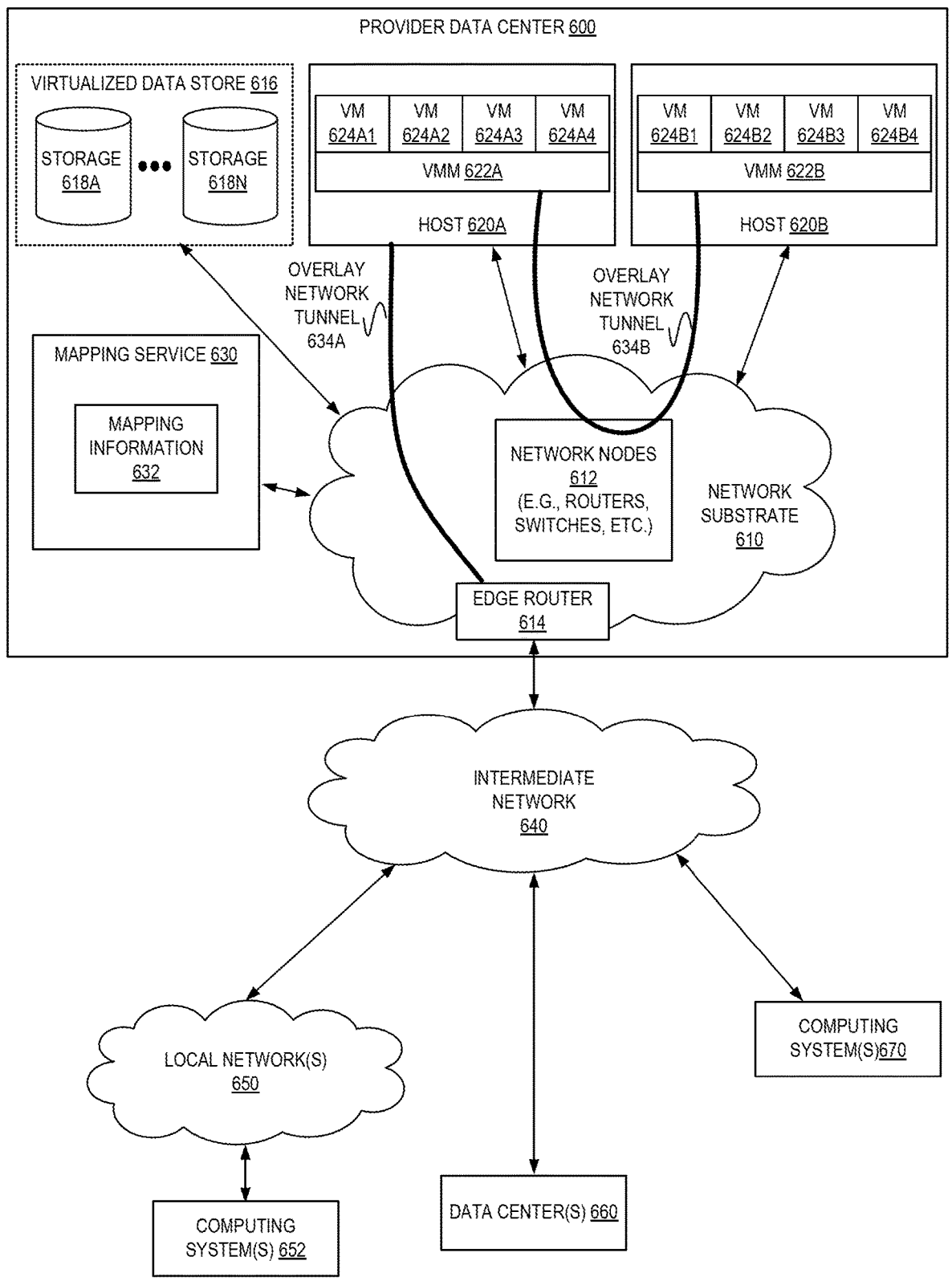
FIG. 6 illustrates an example data center that implements an overlay network on a network substrate using IP tunneling technology, according to some embodiments.

FIG. 6 illustrates an example data center that implements an overlay network on a network substrate using IP tunneling technology, according to some embodiments. A provider data center 600 may include a network substrate that includes networking nodes 612 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 610 using tunnels. The IP tunneling technology may provide a mapping and encapsulating system for creating an overlay network on a network (e.g., a local network in data center 600 of FIG. 6) and may provide a separate namespace for the overlay layer (the public IP addresses) and the network substrate 610 layer (the local IP addresses). Packets in the overlay layer may be checked against a mapping directory (e.g., provided by mapping service 630) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 630) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 6, an example overlay network tunnel 634A from a virtual machine (VM) 624A (of VMs 624A1-624A4, via VMM 622A) on host 620A to a device on the intermediate network 650 and an example overlay network tunnel 634B between a VM 624A (of VMs 624A1-624A4, via VMM 622A) on host 620A and a VM 624B (of VMs 624B1-624B4, via VMM 622B) on host 620B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 6, at least some networks in which embodiments may be implemented may include hardware virtualization technology that enables multiple operating systems to run concurrently on a host computer (e.g., hosts 620A and 620B of FIG. 6), i.e. as virtual machines (VMs) 624 on the hosts 620. The VMs 624 may, for example, be executed in slots on the hosts 620 that are rented or leased to customers of a network provider. A hypervisor, or virtual machine monitor (VMM) 622, on a host 620 presents the VMs 624 on the host with a virtual platform and monitors the execution of the VMs 624. Each VM 624 may be provided with one or more local IP addresses; the VMM 622 on a host 620 may be aware of the local IP addresses of the VMs 624 on the host. A mapping service 630 may be aware of (e.g., via stored mapping information 632) network IP prefixes and IP addresses of routers or other devices serving IP addresses on the local network. This includes the IP addresses of the VMMs 622 serving multiple VMs 624. The mapping service 630 may be centralized, for example on a server system, or alternatively may be distributed among two or more server systems or other devices on the network. A network may, for example, use the mapping service technology and IP tunneling technology to, for example, route data packets between VMs 624 on different hosts 620 within the data center 600 network; note that an interior gateway protocol (IGP) may be used to exchange routing information within such a local network.

In addition, a network such as the provider data center 600 network (which is sometimes referred to as an autonomous system (AS)) may use the mapping service technology, IP tunneling technology, and routing service technology to route packets from the VMs 624 to Internet destinations, and from Internet sources to the VMs 624. Note that an external gateway protocol (EGP) or border gateway protocol (BGP) is typically used for Internet routing between sources and destinations on the Internet. FIG. 6 shows an example provider data center 600 implementing a network that provides resource virtualization technology and that provides full Internet access via edge router(s) 614 that connect to Internet transit providers, according to some embodiments. The provider data center 600 may, for example, provide customers the ability to implement virtual computing systems (VMs 624) via a hardware virtualization service and the ability to implement virtualized data stores 616 on storage resources 618A-618N via a storage virtualization service.

The data center 600 network may implement IP tunneling technology, mapping service technology, and a routing service technology to route traffic to and from virtualized resources, for example to route packets from the VMs 624 on hosts 620 in data center 600 to Internet destinations, and from Internet sources to the VMs 624. Internet sources and destinations may, for example, include computing systems 670 connected to the intermediate network 640 and computing systems 652 connected to local networks 650 that connect to the intermediate network 640 (e.g., via edge router(s) 614 that connect the network 650 to Internet transit providers). The provider data center 600 network may also route packets between resources in data center 600, for example from a VM 624 on a host 620 in data center 600 to other VMs 624 on the same host or on other hosts 620 in data center 600.

A service provider that provides data center 600 may also provide additional data center(s) 660 that include hardware virtualization technology similar to data center 600 and that may also be connected to intermediate network 640. Packets may be forwarded from data center 600 to other data centers 660, for example from a VM 624 on a host 620 in data center 600 to another VM on another host in another, similar data center 660, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 618A-618N, as virtualized resources to customers of a network provider in a similar manner.

Figure 7:
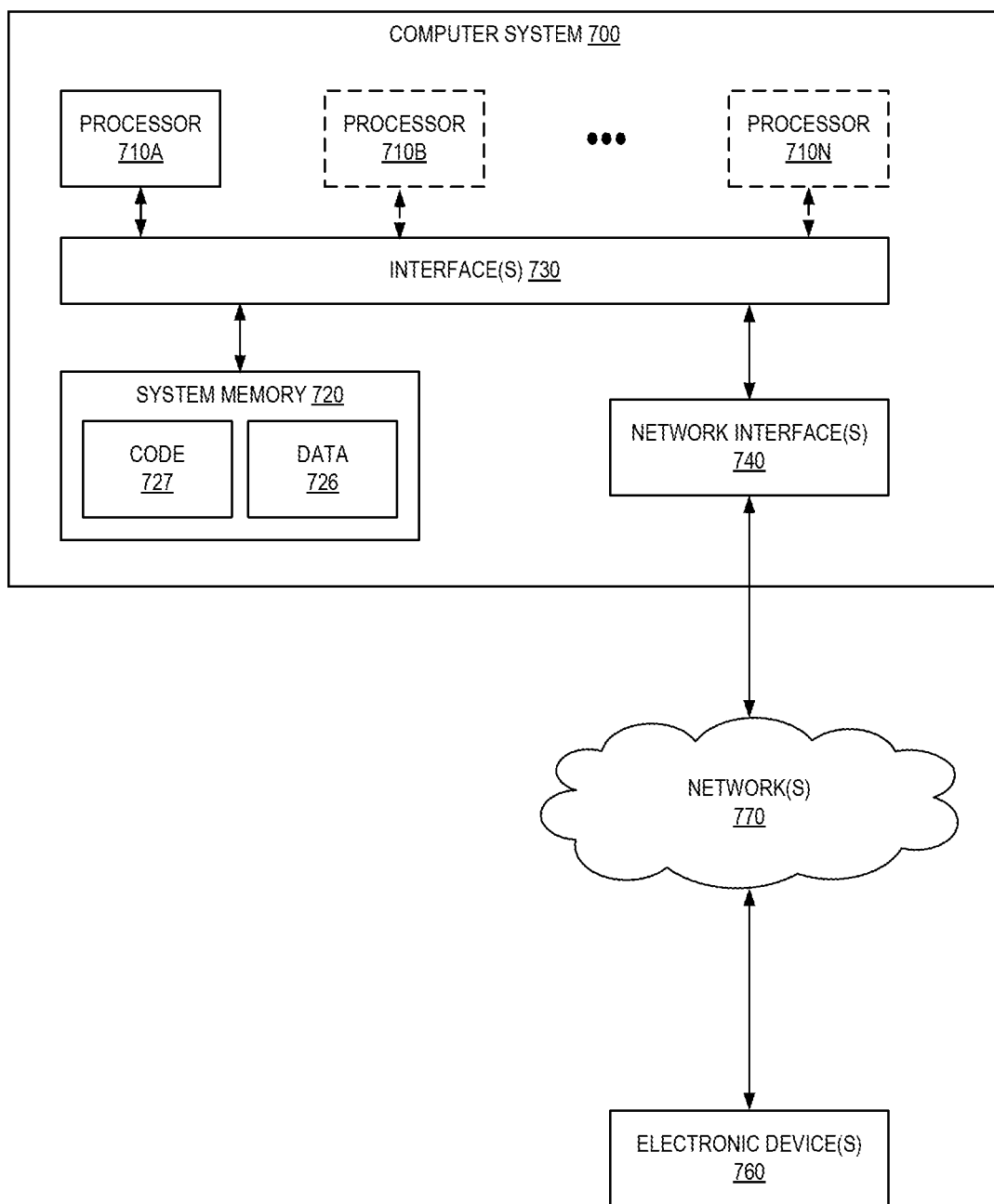
FIG. 7 is a block diagram illustrating an example computer system that may be used in some embodiments.

In some embodiments, a system that implements a portion or all of the techniques for auto-scaling network address spaces of virtual networks in service provider network environments as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via I/O any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

Figure 8:
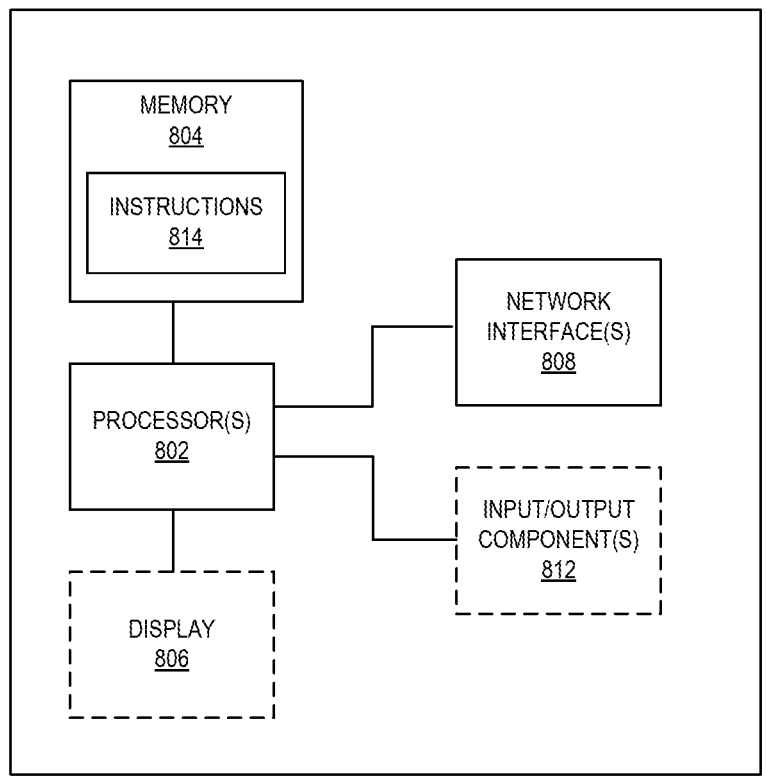
FIG. 8 illustrates a logical arrangement of a set of general components of an exemplary computing device that can be utilized in accordance with various embodiments.

FIG. 8 illustrates a logical arrangement of a set of general components of an example computing device 800 such as an edge device or non-edge device, etc. Generally, a computing device 800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 804) to store code (e.g., instructions 814) and/or data, and a set of one or more wired or wireless network interfaces 808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 804) of a given electronic device typically stores code (e.g., instructions 814) for execution on the set of one or more processors 802 of that electronic device. One or more parts of various embodiments may be implemented using different combinations of software, firmware, and/or hardware.

A computing device 800 can include some type of display element 806, such as a touch screen or liquid crystal display (LCD), although many devices such as portable media players might convey information via other means, such as through audio speakers, and other types of devices such as server end stations may not have a display element 806 at all. As discussed, some computing devices used in some embodiments include at least one input and/or output component(s) 812 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 9:
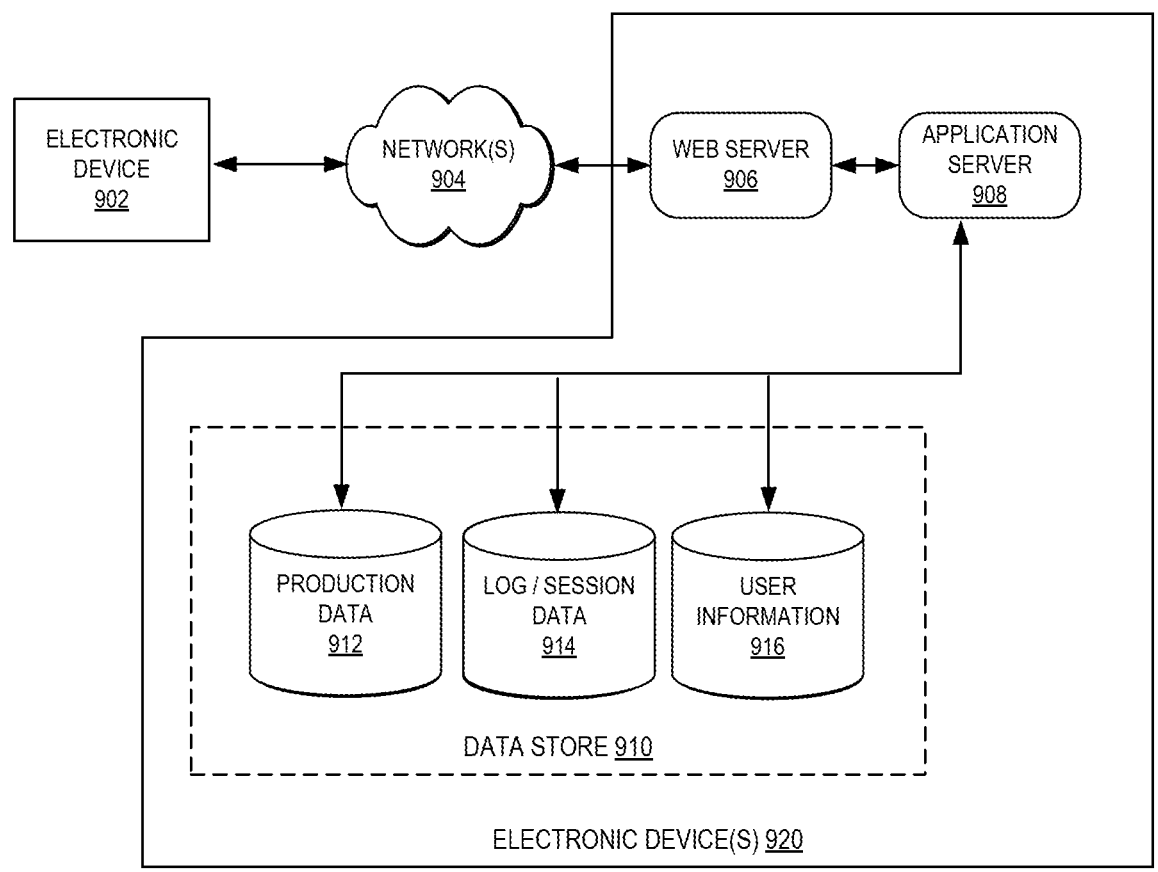
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. For example, in some embodiments the plan request is a HyperText Transfer Protocol (HTTP) request that is received by a web server (e.g., web server 906), and the users, via electronic devices, may interact with the provider network via a web portal provided via the web server 906 and application server 908. As will be appreciated, although a web-based environment is used for purposes of explanation, different environments may be used, as appropriate, to implement various embodiments. The system includes an electronic client device 902, which may also be referred to as a client device and can be any appropriate device operable to send and receive requests, messages or information over an appropriate network 904 and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations, and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
  receiving a request to generate an execution plan for executing a machine learning (ML) model using at least one of an edge device and a web services provider, the request to include at least one objective for the execution of the ML model;
  evaluating execution of usage of the ML model on web services provider hardware and on the edge device by executing the usage of the ML model on web services provider hardware and executing or simulating on web services provider hardware execution of the usage of the ML model by hardware of the at least one edge device and comparing execution characteristics of executing the ML model on either the web services provider hardware or the edge device to generate comparative execution information for each step in the ML model, wherein the execution characteristics of executing the ML model on the edge device are further based at least in part on a hardware characteristic of the edge device;
  generating the execution plan for usage of the ML model based at least in part on the comparative execution information and network latency information, wherein the execution plan comprises an indication of a portion of the usage of the ML model to be executed on at least one of a host of the web services provider or the edge device;

causing the execution plan to be stored on the edge device; and executing at least the indicated portion of the usage of the ML model on the at least one of the host of the web services provider or the edge device based at least in part on the execution plan.

2. The computer-implemented method of claim 1, wherein the at least one objective is one or more of:
an execution throughput of usage of the ML model;
an amount of power to consume during execution of the ML model; or
an amount of resources to be utilized by the edge device.

3. The computer-implemented method of claim 1, further comprising:
generating the ML model from a ML algorithm using a data set prior to evaluating execution of the ML model, wherein the request includes an identifier of a location of the ML algorithm and data set.

4. A computer-implemented method comprising:
receiving a request to generate an execution plan for executing a machine learning (ML) model using at least one of an edge device and a non-edge device, the request to include at least one objective for the execution of the ML model;
generating the execution plan for the usage of the ML model based at least in part on the at least one objective, comparative execution information and network latency information, wherein the comparative execution information is based at least in part on executing the usage of the ML model on non-edge device hardware and executing or simulating on the non-edge device hardware execution of the usage of the ML model by hardware of the at least one edge device and comparing execution characteristics of executing the ML model on either the non-edge device or the edge device, and wherein the execution characteristics of executing the ML model on the edge device are further based at least in part on a hardware characteristic of the edge device; and
executing at least one portion of the usage of the ML model on at least one of a host of the non-edge device and the edge device based at least in part on the execution plan.

5. The computer-implemented method of claim 4, further comprising:
evaluating execution of the ML model on non-edge device hardware and on the edge device by comparing execution characteristics of the executing the ML model on either the non-edge device hardware or the edge device to generate comparative execution information for each step in the ML model.

6. The computer-implemented method of claim 4, further comprising:
generating the ML model from a ML algorithm using a data set prior to evaluating execution of the ML model, wherein the request includes an identifier of a location of the ML algorithm and data set.

7. The computer-implemented method of claim 4, further comprising:
updating the ML model to reflect the at least one portion of the ML model that is to be executed on the host of the non-edge device.

8. The computer-implemented method of claim 4, wherein the ML model is executed on the host of the non-edge device as a container.

9. The computer-implemented method of claim 4, wherein the ML model is executed on the host of the non-edge device as a virtual machine instance.

10. The computer-implemented method of claim 4, wherein the request includes characteristics of the edge device to be used in the simulating of execution of ML model by the edge device.

11. The computer-implemented method of claim 4, wherein the request includes an identifier of the edge device and wherein characteristics of the edge device to be used in the simulating of execution of ML model by the edge device are retrieved from a data store based on that identifier.

12. The computer-implemented method of claim 4, further comprising:
determining a most optimal non-edge device hardware available to run the ML model.

13. The computer-implemented method of claim 4, wherein the at least one objective is one or more of:
an execution throughput of the ML model;
an amount of power to consume during execution of the ML model; or
an amount of resources to be utilized by the edge device.

14. A system comprising:
an edge device; and
a non-edge device coupled to the edge device, the non-edge device including a memory to store program code and a processor to execute the stored program code to cause the non-edge device to:
receive a request to generate an execution plan for executing a ML model using one of the edge device and the non-edge device, the request to include at least one objective for the execution of the ML model;
generate the execution plan for the usage of the ML model based at least in part on the at least one objective, comparative execution information and network latency information, wherein the comparative execution information is based at least in part on executing the usage of the ML model on non-edge device hardware and executing or simulating on the non-edge device hardware execution of the usage of the ML model by hardware of the at least one edge device and comparing execution characteristics of executing the ML model on either the non-edge device or the edge device, and wherein the execution characteristics of executing the ML model on the edge device are further based at least in part on a hardware characteristic of the edge device; and
execute at least one portion of the usage of the ML model on a host of the non-edge device in conjunction with the edge device based at least in part on the execution plan.

15. The system of claim 14, wherein the execution of the stored program code is further to cause the non-edge device to evaluate execution of the ML model on non-edge device hardware and on the edge device by comparing execution characteristics of the executing the ML model on either the non-edge device hardware or the edge device to generate comparative execution information for each step in the ML model.

16. The system of claim 14, wherein the ML model is to be executed on the host of the non-edge device as a container.

17. The system of claim 14, wherein the ML model to be is executed on a host of the non-edge device as a virtual machine instance.

18. The system of claim 14, wherein the request includes characteristics of the edge device to be used in the simulating of execution of ML model by the edge device.

19. The system of claim 14, wherein the request includes an identifier of the edge device and characteristics of the edge device to be used in the simulating of execution of ML model by the edge device are retrieved from a data store based on that identifier.

* * * * *